US012135979B2

(12) United States Patent
Arndt et al.

(10) Patent No.: US 12,135,979 B2
(45) Date of Patent: Nov. 5, 2024

(54) CONTROL PLANE CONFIGURATION

(71) Applicant: Hewlett Packard Enterprise Development LP, Houston, TX (US)

(72) Inventors: Jonas Arndt, Fort Collins, CO (US); Philip Martin Halstead, Winnersh (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 595 days.

(21) Appl. No.: 17/490,588

(22) Filed: Sep. 30, 2021

(65) Prior Publication Data

US 2023/0094937 A1 Mar. 30, 2023

(51) Int. Cl.
*G06F 9/455* (2018.01)

(52) U.S. Cl.
CPC .............. *G06F 9/45558* (2013.01); *G06F 2009/45595* (2013.01)

(58) Field of Classification Search
CPC ....... G06F 9/45558; G06F 2009/45595; H04L 45/586; H04L 41/042; H04L 41/0695
See application file for complete search history.

(56) References Cited

U.S. PATENT DOCUMENTS

| 10,817,346 | B1 | 10/2020 | Culp et al. | |
| 2002/0165961 | A1* | 11/2002 | Everdell | H04L 47/10 709/225 |
| 2008/0144532 | A1* | 6/2008 | Chamarajanagar | H04L 69/40 370/255 |
| 2011/0289342 | A1* | 11/2011 | Schaefer | G06F 11/2007 714/E11.073 |
| 2016/0080502 | A1* | 3/2016 | Yadav | H04L 43/04 709/227 |
| 2018/0091251 | A1* | 3/2018 | Hanneman, Jr. | H04J 14/0283 |
| 2019/0028577 | A1* | 1/2019 | D'Souza | H04L 69/40 |
| 2019/0065323 | A1 | 2/2019 | Dhamdhere et al. | |
| 2020/0059420 | A1* | 2/2020 | Abraham | H04L 41/12 |
| 2020/0073655 | A1 | 3/2020 | Park et al. | |
| 2020/0092392 | A1 | 3/2020 | Seelam et al. | |
| 2020/0100830 | A1* | 4/2020 | Henderson | A61B 50/22 |
| 2020/0250009 | A1 | 8/2020 | Jaeger et al. | |

(Continued)

FOREIGN PATENT DOCUMENTS

WO WO-2020161561 8/2020

OTHER PUBLICATIONS

Carmine Rimi, Deploying Kubernetes at the edge—Part 1: building blocks, Jul. 11, 2019, 3 Pgs.

*Primary Examiner* — Kenneth Tang
(74) *Attorney, Agent, or Firm* — Hewlett Packard Enterprise Patent Department

(57) ABSTRACT

Examples relate to a system comprising a cluster of worker nodes communicatively connected to a control plane. The control plane includes a first control switch and a second control switch. The control switches are configured with a virtual IP address. The IP address is associated with a control switch operating in an active mode. The control switches communicate with a cluster of worker nodes via the virtual IP address. A single instance of a key-value database is deployed on one of the first control switch and the second control switch that is operating in active mode, and the first control switch and the second control switch are functionally coupled by a distributed block system for data synchronization.

22 Claims, 5 Drawing Sheets

(56) References Cited

U.S. PATENT DOCUMENTS

2020/0278892 A1 9/2020 Nainar et al.
2020/0301782 A1 9/2020 Radhakrishnan et al.
2020/0304297 A1 9/2020 Radhakrishnan et al.
2020/0314015 A1* 10/2020 Mariappan .......... H04L 41/0895

* cited by examiner

CONTROL PLANE CONFIGURATION

BACKGROUND

In traditional computing systems, applications may be stored in a storage medium (e.g., a memory) and executed using processing resources available on the computing systems. As an alternative to traditional computing systems, Virtual Machines (VMs) may be abstracted from hardware of a computing system. Multiple VMs can be run on a single computing system or a single VM may run on multiple computing systems. Each VM may utilize a guest operating system, which can be a virtual copy of hardware to run an operating system. Each VM can run an application. Taking this abstraction to a higher level, a container may run applications making use of virtualized operating system. A container can be an executable unit of software that includes code, tools, libraries, and/or settings to run an application. A container can be faster and lighter weight than a VM utilizing a guest operating system.

BRIEF DESCRIPTION OF THE DRAWINGS

Certain examples are described in the following detailed description and in reference to the drawings, in which.

DETAILED DESCRIPTION

Figure 1:
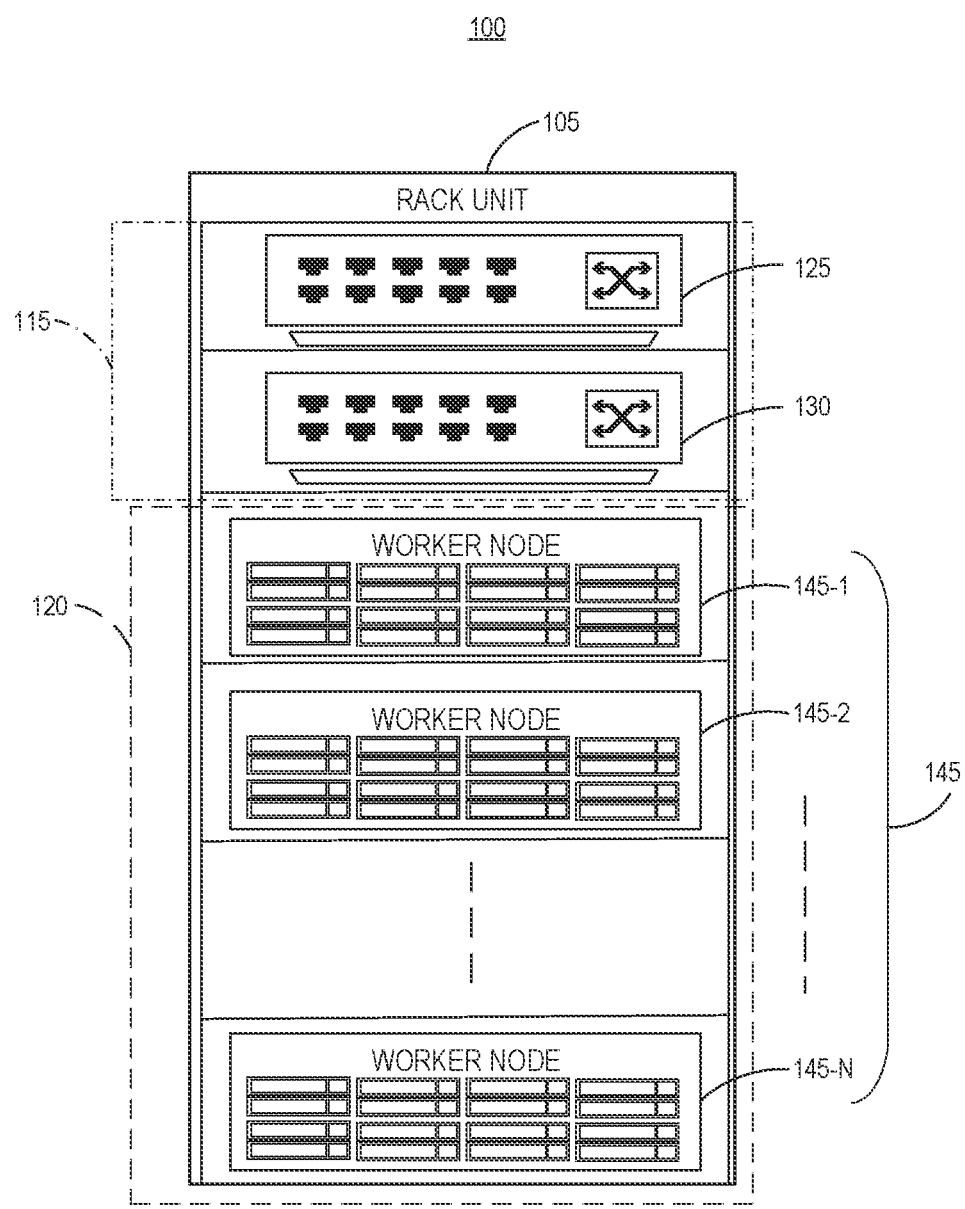
FIG. 1 is a block diagram of a computing system, according to some examples of the present disclosure.

Computing systems, such as servers, may be used for running certain applications or programs. Multiple applications may be run on a single computing system. In such instances, one of the applications may demand more resources, which may affect the performance of the remaining applications. Instead, a dedicated computing system may be used for each application. Such an approach may result in underutilization of resources of the computing system. As an alternative to traditional computing systems, Virtual Machines (VMs) may be considered a popular mechanism for running applications. Multiple instances of a VM can be run on a physical computing resource. Each VM can have its operating system (OS) instance and hence, an application can be isolated to its own VM. In a further level of abstraction, a container may be considered for running applications. A container can be similar to a VM but may also virtualize an operating system, such as an OS kernel. As containers are dissociated with underlying infrastructure (e.g., hardware and OS), they are lightweight and portable. In a deployment environment, container management may be used for managing containerized applications, for high availability. A container orchestration architecture may be used to deploy, scale, and/or manage containerized applications, among other things.

A container orchestration architecture may include a control plane for managing various computing resources and controlling the flow of data. The various computing resources may be a cluster of worker nodes that run containerized applications. Typically, for fault tolerance and high availability, a control plane may run on multiple nodes that are independent of the cluster of worker nodes. For example, a typical container orchestration platform may, as an example, have a control plane formed by three nodes (e.g., servers) for management functions and two nodes for load balancing between the three nodes. In some instances, a container orchestration platform may include a distributed storage system, such as etc distributed (etcd) type distributed storage system, deployed on three nodes/servers. The three-node etcd configuration may offer high availability based on a Raft/leader-election based technique. Further, a control plane may communicate with a cluster of worker nodes through a load balancer, which may be formed by two nodes.

In some production environments, such as edge implementations, a container orchestration infrastructure, such as the one with the aforementioned configuration, may be deployed physically close to end-user or data generation points. Space availability may be more limited at edge implementations than at data centers. A small server rack may fit in such limited available space. Moreover, a control plane of the container orchestration architecture may take up a significant percentage of total space available in a server rack, e.g., 20-35% or in some instances more than 50% of the total space available. The remaining space may be used for accommodating a limited number of worker nodes, such as servers, that are used for running containerized applications.

Certain examples of the present disclosure are directed to a container orchestration platform. The container orchestration platform may include a pair of control switches for control plane functions. In some examples, the pair of control switches may be Ethernet-based switches. The control plane functions may include managing a cluster of worker nodes and workloads such as pods, containers, or the like. The pair of control nodes enable networking among the worker nodes and the cluster of worker nodes to communicate outside the network. In some examples, for providing container orchestration and control plane functions, one control switch may operate in active mode and the other control switch in a passive mode (i.e., standby mode). In passive mode, the control switch may perform switching operations but does not perform any control plane functions. The switching operations may include receiving data from a source and forwarding that data to a destination (e.g., data link/layer-2 functions) and/or transmitting data using routing functionalities (e.g., layer-3 functions). The control functions may include maintaining status and configuration of the container orchestration platform, running of containers and/or pods on data plane resources, etc. The data may include an operational status of worker nodes, and on which worker nodes various pods should be running or are currently running. In some examples, a virtual internet protocol address may be provided between the control plane and the cluster of worker nodes for communication. Further, a single instance of a key-value database may be available on the active control switch. Examples of a key-value database may include etc distributed (etcd) or similar key-value databases. The key-value database may be configured to store data related to workloads including containers, state of the cluster of worker nodes, and the like. In some examples, a networked mirror system may replicate data from the active control switch to the standby control switch. The active control switch may periodically advertise its active state to the passive control switch. Based on a failure to receive active state advertisements, the passive control switch takes over management of the cluster of worker nodes and workload. The control plane framework provides a resilient system with scalability and failover options for high availability, while maintaining a substantially small form factor for edge deployments.

Examples of the present disclosure are directed to a container orchestration platform capable of accommodating a larger cluster of worker nodes for handling workloads. A pair of control switches, such as Top of Rack switches, is configured to perform control plane functions with minimal footprint on server rack configuration. Hence, space may be released in a rack for accommodating additional worker nodes, when compared to a typical container orchestration platform. In some examples, a standard rack configuration may accommodate a larger cluster of worker nodes when compared to traditional container orchestration platforms. The control plane may utilize a small portion of the rack unit configuration. For example, a pair of Top-of-Rack switches may be configured to form the control plane. The pair of control switches (i.e., control plane) with integrated management and networking operations may reduce a physical footprint of the control plane, releasing additional space for a cluster of worker nodes. Further features and advantages of the present disclosure can be appreciated from the following description.

The following discussion is directed to various examples of the present disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but is not limited to, the term "including" means including but not limited to. The term "based on" means based at least in part on.

Now referring to figures, FIG. 1 is a block diagram representing a computing system 100, according to some examples. The computing system 100 may correspond to a container orchestration platform, which can be used to automate deployment, scaling, and management of containerized applications. Herein, containers may be similar to Virtual Machines (VMs) but with a further abstraction of operating system (OS) virtualization. A container may share access to an OS kernel and may be placed in a VM or physical computing device. In some examples, one or more containers may be grouped for co-location and/or co-scheduling. For example, containers of a given container group may be tightly coupled, such that the containers within a container group may be of a same logical host, i.e., a same physical or virtual machine. A group of one or more containers can form a pod. Containers of a pod can share storage and network resources. A pod may be created during deployment. A pod may be associated with a worker node until termination or deletion of that particular pod. Each container may include executables, binary code, libraries, and configuration files. Containers, and specifically container groups, may be, deployed, scaled, and otherwise managed via a container orchestration platform such as the computing system 100, as per some examples.

In some examples, the computing system 100 may be a networked architecture with a defined control plane 115 and a data plane 120. The control plane 115 may be functionally connected to the data plane 120 and is configured to manage compute capabilities for executing one or more workloads on the data plane 120. Examples of the workloads may include but are not limited to, a containerized application, a container, a pod, a virtual machine, or the like. In some examples, the control plane 115 may include a first control switch 125 and a second control switch 130, configured to provide fault tolerance and high availability for managing virtualized workloads. The control switches 125, 130 are configured to perform computing, management, and networking operations.

The data plane comprises a duster of worker nodes 145-1, 145-2, . . . , and 145-N. Hereinafter, the duster of worker nodes is collectively referred by reference numeral '145.' Examples of the cluster of worker nodes 145 may include a cluster of servers. In some additional examples, the cluster of worker nodes 145 may host application pods, which may be basic blocks for execution of applications. Each worker node 145-1, 145-2, . . . , or 145-N may include a processor or microcontroller and/or any other electronic component, or a device or system that enables compute and/or storage operations In some examples, the cluster of worker nodes 145 may be a homogeneous type with similar hardware and/or software. In some other examples, the cluster of worker nodes 145 may be a heterogeneous type with different hardware and/or software configurations.

By way of additional examples, the cluster of worker nodes 145 may have high-end compute capabilities. Further, some workers nodes may facilitate strong data security, and certain worker nodes may have enhanced thermal capabilities. In some examples, the worker nodes may include but are not limited to, other container-orchestration systems, clusters of container-orchestration systems, a computing device, a workstation, a desktop computer, a laptop, a smartphone, a storage system, storage array, or a converged or hyperconverged system, and the like.

In some examples, the computing system 100 may be deployed in one or more rack units 105. The example computing system 100 comprises a single rack form factor, i.e., deployed on a rack unit 105. The control switches 125, 130 may be Top-of-Rack (ToR) switches disposed on the rack unit 105. The cluster of worker nodes 145 may be disposed in the rack unit 105. As an illustrative example, the control plane 115 formed by the control switches 125, 130 may occupy 10-20% of the total space available for the computing system 100. The remaining 80-90% of the space in the rack unit 105 may be utilized for deploying the cluster of worker nodes 145. Even in a small form factor rack unit configuration, the control plane 115 occupies minimal space, and a substantial space can be reserved for the cluster of worker nodes 145 (e.g., servers) that are primary workload handling members. In some examples, a computing system may utilize more than one rack unit, and the control switches 125, 130 may be disposed on different rack units in such configuration.

In some examples, each control switch 125, 130 may include an Ethernet switch comprising networking and processing capability. For example, each control switch 125, 130 may include network interface components, ethernet ports, or like for connection with and among the cluster of worker nodes 145. Additionally, the first control switch 125 and the second control switch 130 are configured with a virtual internet protocol (IP) address. The control switches 125, 130 communicate with the cluster of worker nodes 145 via the virtual IP address, which is elaborated in examples of FIG. 2 Further, a single instance of a storage system with a network mirrored system is deployed in the control plane 115 for storing data, state of workloads, and state of worker nodes, which is further elaborated in examples of FIGS. 3 and 4.

In some further examples, the computing system 100 may be deployed in an edge location. Herein, "edge location" may refer to a physical location that may be proximal to an end-user. The end-user may access services for running applications related to computing/storage/networking functions with low latency, which may be due to a reduced distance that data may have to traverse. Example deployments may include telecommunication services, such as fifth-generation (5G) telecommunication standards. The computing system 100 may be deployed in proximity to a base station of a cellular service provider, for effectively handling compute and network related applications. In some examples, the applications may include data-intense areas such as the Internet of Things (IoT). The computing system 100 of the present disclosure can be deployed in deep edge locations (i.e., remote locations) and configured to provide high availability with a small form factor. In some other examples, the computing system 100 may be deployed in an organization or an enterprise including, but not limited to, businesses, manufacturing, medical services, data-intense fields, or the like.

Figure 2:
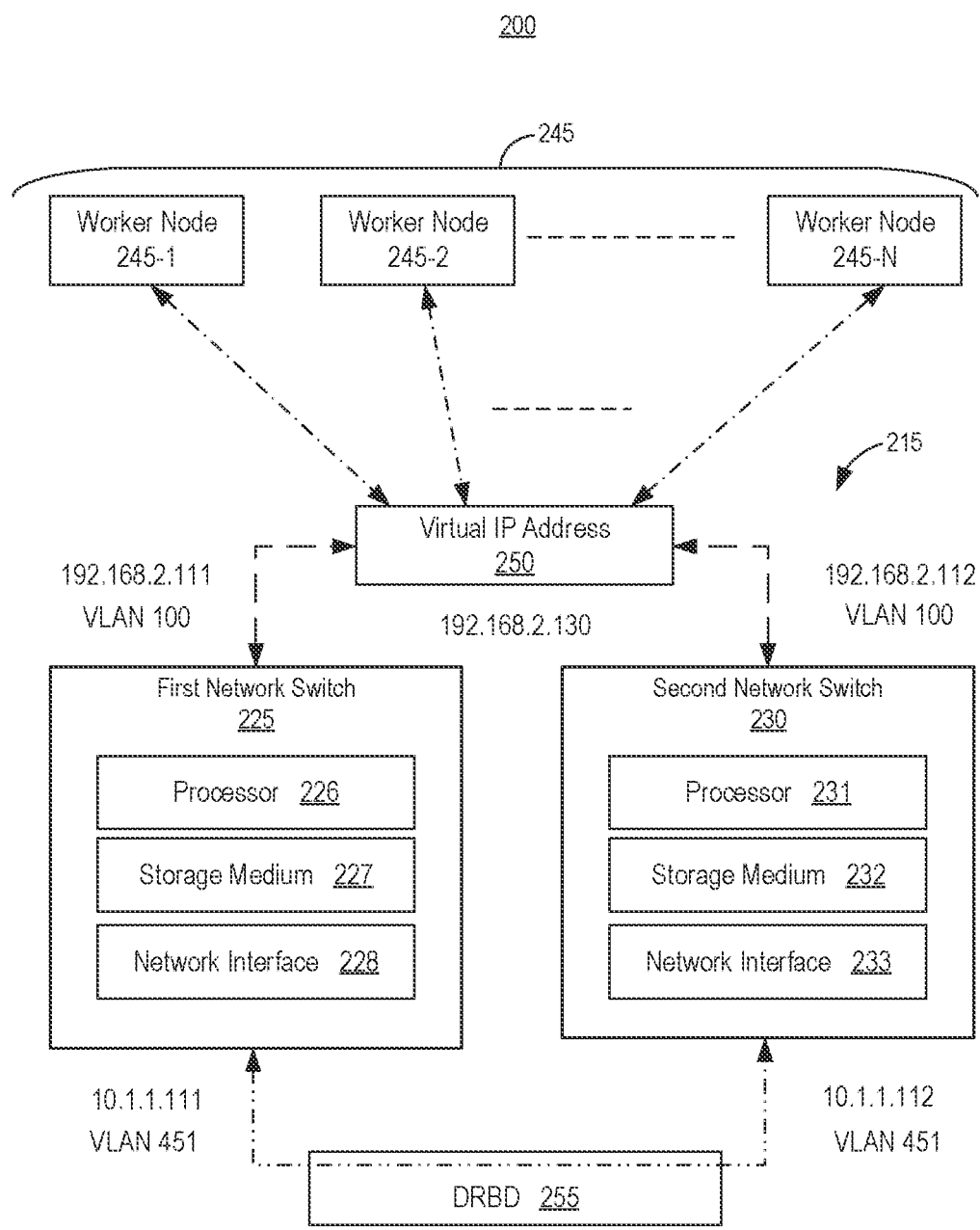
FIG. 2 is a block diagram of a container orchestration platform, according to some examples of the present disclosure.

FIG. 2 is a block diagram of an example container orchestration platform 200, according to some examples. FIG. 2 may incorporate some of the features described in FIG. 1 above, including control plane 115 (referred by '215' in FIG. 2), and a duster of worker nodes 145 (referred by '245' in FIG. 2). Platform 200 includes a first control switch 225 and a second control switch 230. Each control switch 225, 230 comprises a processor 226, 231, a storage medium 227, 232, and a network interface 228, 233. Some of these components may be elaborated below with reference to the first control switch 225 and similar features/functions may apply to the second control switch 230 as well.

In some examples, the storage medium 227 may be a "non-transitory computer-readable" type. The storage medium 227 may store data and/or instructions that cause the first control switch 225 to perform one or more specific actions as discussed herein. Such non-transitory storage media may be non-volatile type, as per some examples. The storage medium 227 may be any electronic, magnetic, optical, or other physical storage apparatus. For example, the storage medium described herein may be any of Random Access Memory (RAM). Electrically Erasable Programmable Read-Only Memory (EEPROM), volatile memory, non-volatile memory, flash memory, a storage drive (e.g., a Hard Disk Drive (HDD), a Solid State Drive (SSD)), any type of storage disc (e.g., a compact disc, a Digital Versatile Disc (DVD), etc.), or the like, or a combination thereof. The processor 226 may fetch, decode, and execute instructions stored in the storage medium 227 to manage workloads and a cluster of worker nodes 245-1, 245-2, . . . , 245-N (collectively, '245'), as described herein.

The processor 226 may be a physical device, for example, one or more central processing units (CPUs), one or more semiconductor-based microprocessors, one or more graphics processing units (GPUs), application-specific integrated circuit (ASIC), a field-programmable gate array (FPGA), other hardware devices capable of receiving and executing instructions stored in the machine-readable storage medium, or combinations thereof. In some examples, the network interface 228 may include a physical port, software, hardware, firmware, circuitry, or a combination thereof. Examples of network interface 228 may correspond to the Institute of Electrical and Electronics Engineers (IEEE) 802.3 Ethernet interfaces.

In some examples and not by way of limitation, each network interface 228, 233 of the control switches 225, 230 may include a plurality of ethernet ports with a speed of 10-200 Gigabit Ethernet (GbE) per port. Further, the control switches 225, 230 may include a Random-Access Memory (RAM) with 8 Gigabytes, a processor 226, 231 such as a quad-core or an octa-core processor, a storage medium 227, 232 such as 32 Gigabytes of storage such as a Solid-State Drive (SSD), etc. Alternative control switch configurations may be used for appropriate management and networking operations based on workload requirements. In some examples, one of the control switches 225 or 230 operates in active mode, and the other control switch 230 or 225 operates in a passive state for failover. The control plane 215 formed by the control switches 225, 230 may make a global decision corresponding to the cluster of worker nodes 245 and detecting/responding to cluster events, such as management of pods or creation of pods under certain conditions associated with application requirement.

Further, in some examples, a virtual Internet Protocol (IP) address 250 is provided between the duster of worker nodes 245 (i.e., data plane) and the control switches 225, 230 (i.e., control plane). The virtual IP address 250 may be based on a Virtual Router Redundancy Protocol (VRRP). When compared to a typical container orchestration platform, instead of a load balancer, the cluster of worker nodes 245 may communicate with a control switch operating in an active mode via the virtual IP address 250. Use of a load balancer may be avoided by using the two server nodes instead, thereby releasing additional space for worker nodes In some examples, the virtual IP address 250 is configured to function as a default gateway. For example, 192.168.2.130 may be a virtual IP address 250 assigned to the control plane 215.

Further, the first control switch 225 and the second control switch 230 may have static IP addresses 192.168.2.111 and 192.168.2.112, respectively. The virtual IP address 250 may be a floating Internet Protocol (IP) address configured to associate with the IP address corresponding to a control switch that is operating in active mode. The virtual IP address 250 may be associated with a control switch operating in active mode. Any requests/communication from worker node(s) is directed to the control switch in active mode. Further, a first Virtual Local Area Network (VLAN), such as VLAN 100, may be used to communicatively connect the control plane 215 to the cluster of worker nodes 245. Traffic between the cluster of worker nodes 245 and the control plane 215 can be communicated via the VLAN 100. In some examples, various VLAN configurations may be provided to enable isolation of data and/or services related communication.

In some examples, each control switch 225, 230 may include a storage system/block device, such as a key-value database for consistent and reliable storage of data, storage of status of worker nodes, container and pod-related information, etc. Examples of the key-value database may include an etc distributed (etcd) The key-value database is not limited to etcd and other key-value databases or key-value stores can be used. A key-value database may be a software or kernel used for storing and retrieving data using key-value pairs. In various examples, a data structure such as hash tables may be used to map keys to values based on a hash function. The storage system is provided in single instance mode whereby the storage system is active on one of the control switches. Through a second VLAN, such as 'VLAN 451' configuration, the storage systems of the control switches 225, 230 may be synchronized through a networked mirror system. For example, a Distributed Replicated Block Device (DRBD) 255 may be used for networked mirroring of block devices. In some examples, an active control switch (e.g., the first control switch 225) may orchestrate containers. The passive control switch may comprise data (e.g., state and configuration of container orchestration platform, information corresponding to containers and/or pods running on worker nodes, the status of worker nodes, etc.) used for taking control during a failure of the active control switch. In some examples, the networked mirroring is performed via VLAN 451 using a dedicated network interface and IP addresses. For example, the first control switch 225 and the second control switch 230 may use IP addresses 10.1.1.111 and 10.1.1.112, respectively, for synchronization. The VLAN 451 may operate independently of the data traffic that is handled through VLAN 100.

In some examples, the virtual IP address 250 may be configured for high availability and based on a "Keepalived" service. Keepalived may be a software component or a service that may detect loss of communication from the active control switch and may associate the virtual IP address 250 to a back-up control switch. Further, the Keepalived may be configured to perform one or more actions such as unmounting a file system on the active control switch and activating the DRBD device for read-write operations. Further, the Keepalived mounts the DRBD device on the passive device and starts etcd on the switch being promoted to active mode. The passive control switch (e.g., the second control switch 230) may receive active state advertisement packets (e.g., VRRP advertisement packets) transmitted by the active control switch (e.g., the first control switch 225). The advertisement packet(s) may be transmitted at a pre-defined interval by the active control switch. Based on a failure of receival of advertisement packets over a pre-determined time (e.g., three consecutive instances), the second control switch 230 may be promoted to active mode to manage the cluster of worker nodes 245 via the virtual IP address 250. Thus, the pair of control switches 225, 230, such as Top-of-Rack (ToR) switches, offer high availability for container orchestration. In some examples, the control switches 225, 230 may form a VRRP group with a control switch assigned a high priority to operate in active mode.

Figure 3:
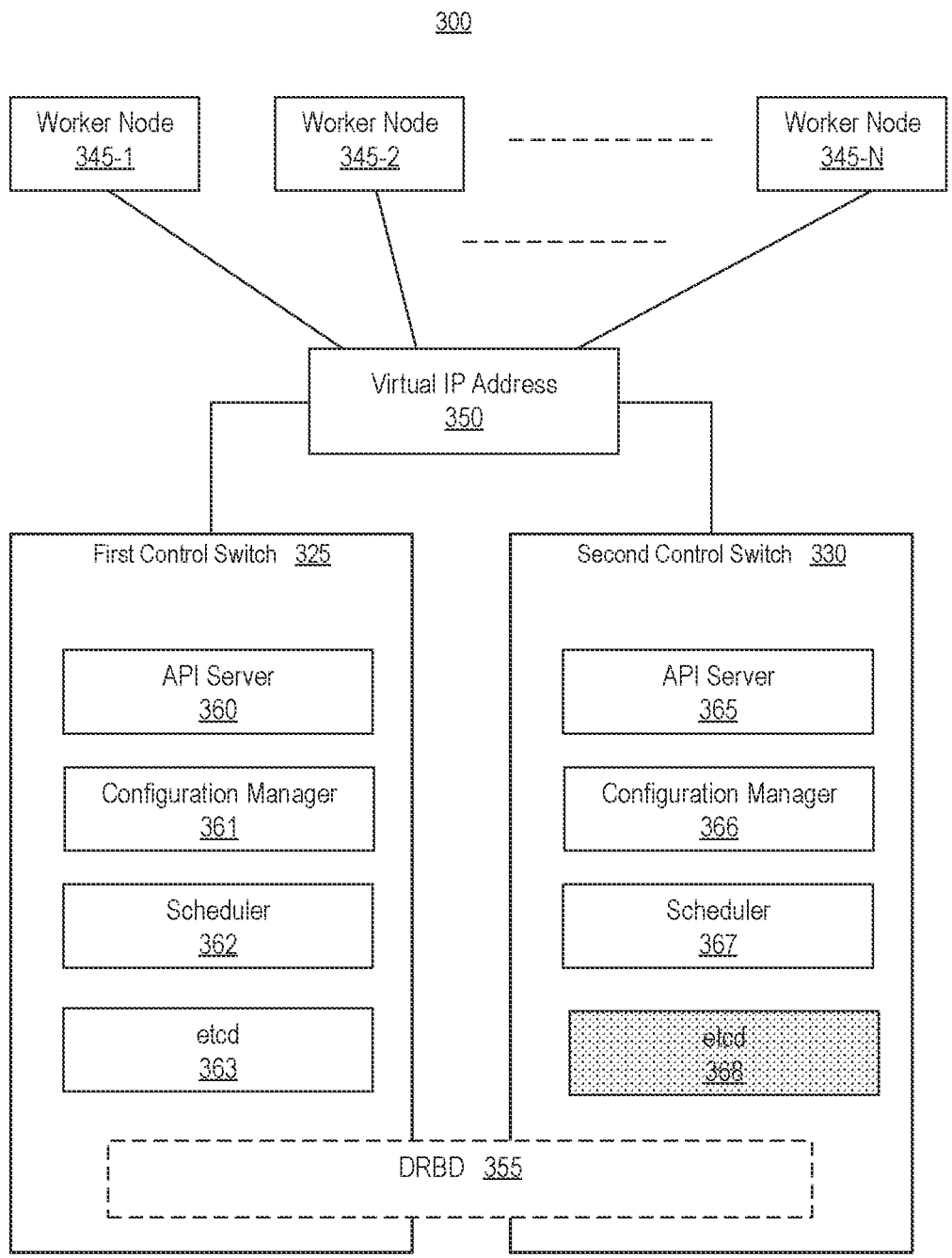
FIG. 3 is a block diagram of a container orchestration platform and a control plane, according to some examples of the present disclosure.

FIG. 3 illustrates a block diagram of a control plane formed by a pair of control switches for a container orchestration platform, such as the platform 200 illustrated in FIG. 2, as per some examples. FIG. 3 may incorporate some of the features of architecture from the aforementioned examples. A first control switch 325 comprises an Application Program Interface (API) server 360, a configuration manager 361, a scheduler 362, an etcd 363, and other components for management operation. Similar components 365-368 are provided on a second control switch 230 and hence, discussion of components of the first control switch 325 may apply to the second control switch 330 as well.

Considering the first control switch 325, the API server 360 may be a communicating component for communication between internal components of the first control switch 325. Further, the first control switch 325 may communicate with external components (i.e., data plane formed by a cluster of worker nodes 345) through its API server 360 and via a virtual IP address 350. The configuration manager 361 may determine the current state of the cluster of worker nodes 345 and may determine any state change. Based on the determination of any stage change, the configuration manager 361 may solve any errors that have caused the change of state. Examples of state change may include but are not limited to the failure of any worker node or the like. The scheduler 362 may receive a request from the API server 360 and may assign the requests to one or more worker nodes 345-1, 345-2, . . . , or 345-N selected from the cluster of worker nodes 345. In some examples, one or more worker nodes 345 may be selected based on their operational state. In some instances, where worker nodes 345 with a set of resources are unavailable, pods may be kept on hold condition till a suitable state is achieved by worker node(s) from the data plane. The set of resources may include processing power, storage capacity, and/or networking capability to place a pod. Similarly, the second control switch 330 is configured with similar components 370-373 and may perform one or more actions when operating in active mode.

Further, the first control switch 325 comprises a key-value based storage system, such as etcd 363. The first control switch 325 may retrieve the aforementioned status data from etcd 363. In some examples, etcd 363 is operated in a single instance mode, which runs on the control switch operating in active mode. Examples of single instance mode may include mounting the storage system on an active control switch for read-write operations. In some examples, a networked mirror system or networked block device such as Distributed Replicated Block Device (DRBD) 355 may be used for networked mirroring of block devices (i.e., storage systems of control switches 325, 330).

Figure 4:
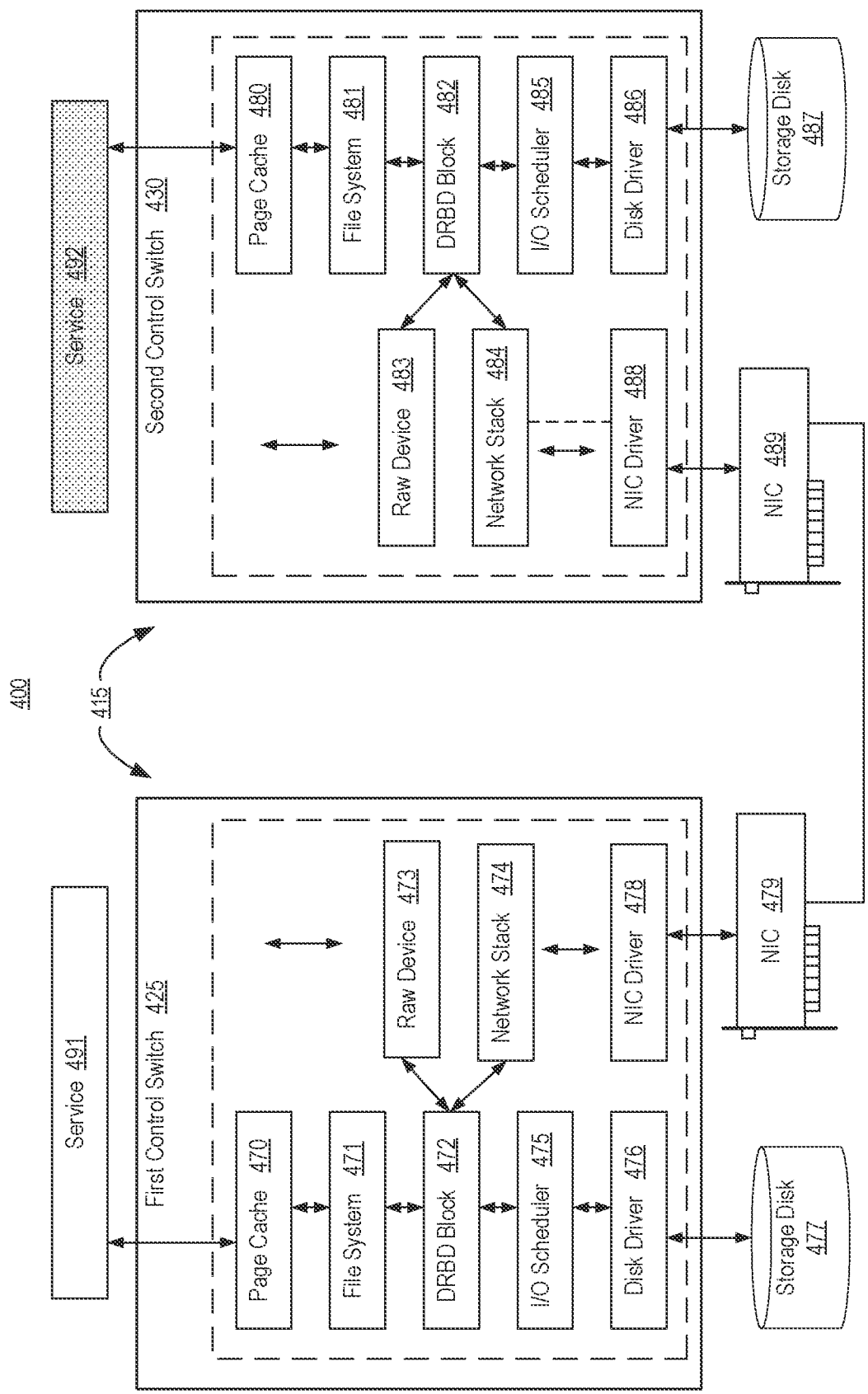
FIG. 4 is a block diagram of a computing system illustrating a storage mechanism thereof, according to some examples of the present disclosure.

FIG. 4 is a block diagram of an example computing system illustrating a storage mechanism thereof. The computing system may include one or more features discussed in FIGS. 1-3 Further, the block diagram illustrates an example storage mechanism used in a control plane 415 of the computing system 400. The control plane 415 may include a pair of control switches 425, 430. For the purpose of explanation of examples associated with FIG. 4, the first control switch 425 may be considered to be operating in active mode and the second control switch 430 in passive mode.

In some examples, the control switches 425, 430 may support the installation of any standard operating system distribution. The first control switch 425 comprises a page cache 470, a file system 471, an input-output (I/O) scheduler 475, and a disk driver 476 for handling the storage disk 477. Similar components 480, 481, 485, and 486 may be available on second control switch 430. In a regular storage mechanism, data may be written to the storage disk 477, and write operation may be performed through the components 470, 471, 475, and 476. Similar components may be available in the second control switch 430.

In some examples, a DRBD component, such as DRBD 472, may be disposed between an upper level including the page cache 470 and the file system 471, and a lower level including the 1/O scheduler 475 and the disk driver 476. In other words, the DRBD component is disposed between a file system 471 and the storage disk 477. The DRBD 472 may be configured to perform network mirroring of block devices that correspond to the first control switch 425 to the second control switch 430. The DRBD 472 may enable mirroring of any block write operations to a block device (e.g., storage disk), synchronously. The single instance etcd in the back end may be available for read-write operations. The storage system, such as etcd, at the back end of a control switch operating in passive mode, may not be available for read-write operations. The container orchestration platform of the present disclosure provides high availability of services with failover and minimizing/eliminating loss of data using a pair of control switches, unlike a three-node cluster for storage that depends on Raft/leader-based technique with a larger footprint.

In some examples, the control switches 425, 430 may be connected via network interface cards (NICs) 479, 489, and corresponding network drivers 478, 488. In some examples, such as examples illustrated in FIG. 2, the control switches 425, 430 may use dedicated VLAN configuration (e.g., VLAN 451) along with specific IP addresses for the networked mirror of block devices. The first control switch 425 may be in service 491 with a virtual IP address of a control plane 415 associated with it. In the illustrated example, the second control switch 430 is in passive mode, and a service 492 of the second control switch 430 is in a passive state for failover.

In some examples, in a production environment or at edge deployment, a dual path is provided between the control switches 425, 430 to avoid split-brain. For example, two physical ports on one control switch may be connected to corresponding two physical ports on another control switch. During the failure of one physical connection between the pair of switches 425, 430, the switches may communicate through the other redundant connection. Thus, both switches 425, 430 may not switch to active mode due to the failure of one connection between them. In some other examples, the pair of control switches 425, 430 may not have a quorum (i.e., an odd number of devices to establish consensus for election) and both switches may enter active mode. This may lead to conflict in handling services or service requests from the cluster of worker nodes. This may also lead to inconsistent replication of status on block devices and may result in corruption of data. In some other examples, a multi-path may be provided between the switches for higher redundancy to eliminate split-brain.

The control switches 425, 430 may perform real-time synchronization of data. For example, the synchronization may be based on networked mirroring of the storage disk 477 to the storage disk 487. In some examples, the networked mirroring may take a path via the DRBD 472, a network stack 474, NIC driver 478, and NIC 479 of the first control switch 425 to NIC 489, a network stack 484, the DRBD 482, and the storage disk 487. A single instance of the key-value database may be mounted on the control switch, operating in active mode. Synchronization of data may occur even when applications are modifying data on an active control switch. In some examples, the control switches 425, 430 may be configured with synchronous replication protocol. With the synchronous replication protocol, the control switch in active mode may perform a write operation on the local storage system and it may be considered to be complete when write operation on both the storage disks (i.e., corresponding to active switch and passive switch) is complete. During the failure of the control switch in active mode, the control switch in passive mode may take over. As discussed in FIG. 2, a VLAN 451 may be used for high-speed connectivity for networked mirroring of storage disks In some examples and not by way of limitation, the storage disks may be network mirrored at speed of 100 Giga bits per second (Gbps).

In some examples, the DRBD system enables creating and mounting of a file system. The file system may have a mount point at /var/lib/etcd and the DRBD related resources can be mounted at the mount point. The mounting may be performed on the control switch operating in active mode, for a single instance operation. In some examples, etcd (e.g., the etcd 363) may store its database at the mount point. The DRBD 472 is coupled to a raw device 473 and can be used for storing metadata. In various examples, the raw devices 473, 483 may be a disk or a disk partition that can be synced between the control switches 425, 430 based on DRBD 472, 482. Based on a condition that the passive control switch fails to receive advertisement (e.g., Keepalived related advertisement), the first control switch 325 may halt selected services for unmounting the DRBD 472. Further, the second control switch 430 may be promoted to active mode, and the first control switch 425 demoted to standby mode. In some examples, the Keepalived component may unmount the file system on the first control switch, activate the DRBD block 482, and mount the file system (e.g., etcd) on the second control switch 430. The computing system 400 may alert a system administrator regarding a change of state in the control plane 415 or a possible failure of one of the control switches 425, 430.

Figure 5:
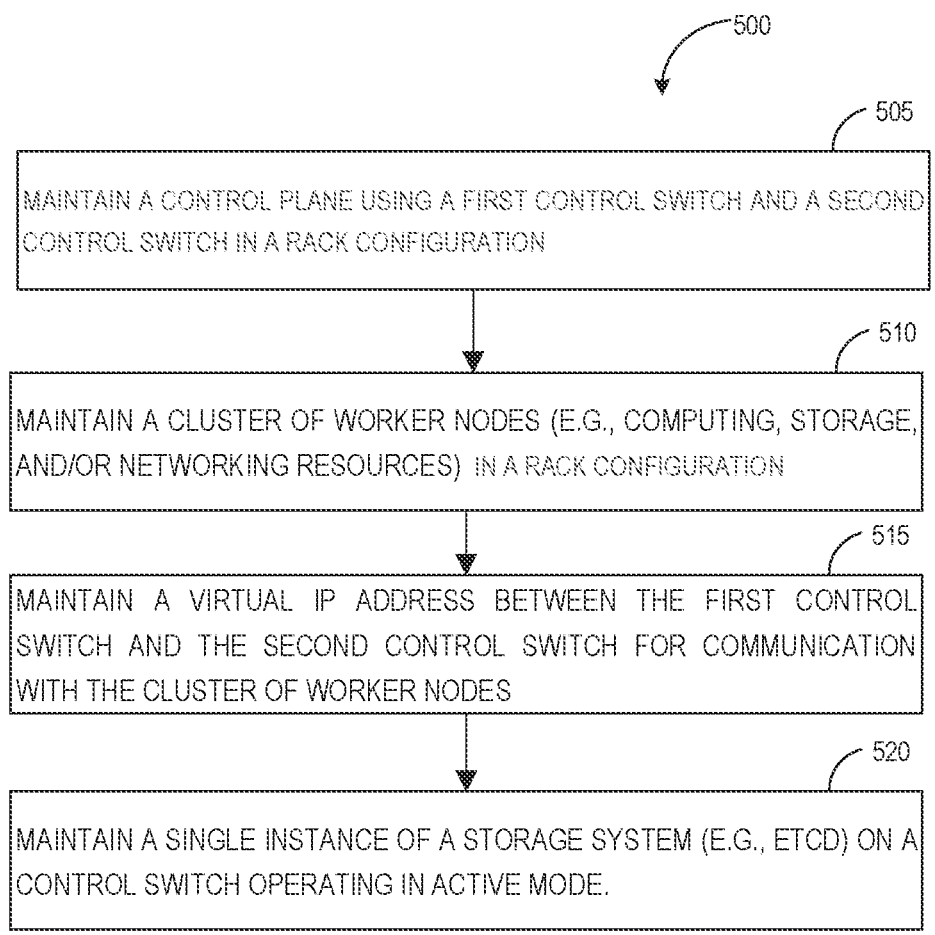
FIG. 5 is a flow diagram of an example method for assigning control plane role to control switches in a computing system, according to various examples discussed herein.

FIG. 5 is a flow diagram 500 for a method for assigning control plane role to a pair of control switches in a computing system, according to the examples discussed herein In some examples, at 505, the method may include maintaining a control plane using a pair of control switches (e.g., the first control switch 125, 225, 325, or 425 and the second control switch 130, 230, 330, or 430 as per examples discussed herein). The control switches 325, 330 may be Ethernet switches provided in rack unit configuration, such as Top-of-Rack (ToR) switches. In some examples, maintaining the control plane may include operating one control switch in active mode and other control switch in passive mode.

At 510, the method may include maintaining a cluster of worker nodes, including one or more computing, storage, and/or networking resources. The cluster of worker nodes may be deployed in the rack unit configuration. The cluster of worker nodes forms a data plane of container orchestration platform. Workloads can be run on the data plane. Maintaining the cluster of worker nodes may include maintaining either a virtual or a physical machine. In some examples, each worker node is managed by the control switch operating in active mode. A worker node can have one or more pods hosting application instances. Further, the cluster of worker nodes is maintained for scheduling pods on them, based on the availability of resources on each worker node.

At 515, the method may include maintaining a virtual IP address for communication between the cluster of worker nodes and the control plane (i.e., the first control switch and the second control switch). Maintaining the virtual IP address may include associating the virtual IP address with the control switch operating in active mode. In some examples, the worker nodes may communicate with an API server (e.g., the API server 360 of FIG. 3) deployed on the control switch via the virtual IP address. The control plane may communicate with a worker node, a pod, or a service via the virtual IP address being maintained. The virtual IP address, such as a floating IP address, based on VRRP may be a gateway for a cluster of worker nodes for communicating with a control switch that is in active mode.

At 520, the method may include maintaining a single instance of a file system, such as etcd, on a control switch operating in active mode. Maintaining the single instance of the file system may include operating the file system, such as a distributed key-value store, in the back end. Applications, pods, or worker nodes can read/write on the active control switch. The active control switch may communicate with the storage system to read and write information related to state and configuration In some examples, the method may also include maintaining a networked mirror system for mirroring the storage system of the control switch in active mode with a storage system of a control switch in passive mode. Examples of networked mirror systems may include DRBD Maintaining the networked mirror system may include mirroring state and configuration data from the active control switch to the passive control switch. For example, data writes from a storage disk of the active control switch may be simultaneously network mirrored to a storage disk of the passive control switch without interference to workloads. The storage disk may be used for networked mirroring and read/write access may be limited to DRBD for replication of data.

While examples described above may be with reference to specific mechanisms for assigning roles to network components, any other appropriate mechanism for assigning roles to network components may be used in accordance with the principles described herein.

In some examples described herein, combinations of hardware and programming may be implemented in a number of different ways. For example, the programming for the control switches (e.g., the control switches 325, 330) may be processor-executable instructions stored on at least one non-transitory computer-readable storage medium, and the hardware for the control switches 325, 330 may include at least one processing resource to execute those instructions. In some examples, the hardware may also include other electronic circuitry to at least partially implement at least one of the operation(s) of the control switches 325, 330. In some examples, at least one computer-readable medium may store instructions that, when executed by at least one processing resource, at least partially implement some or all of the operation(s). In such examples, a computing device may include at least one computer-readable storage medium storing the instructions and the at least one processing resource to execute the instructions.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A system comprising:
a cluster of worker nodes; and
a control plane functionally connected to the cluster of worker nodes, wherein the control plane comprises:
a first control switch; and
a second control switch, wherein
the first control switch and the second control switch are configured with:
a floating internet protocol (IP) address to associate with one of the first control switch and the second control switch operating in active mode, and the control plane and the cluster of worker nodes communicate therebetween via the floating IP address, wherein the other of the one of the first control switch and the second control switch operates in passive mode; and
a single instance of a key-value database deployed on the one of the first control switch and the second control switch that is operating in the active mode, and the first control switch and the second control switch are functionally coupled by a distributed block system for data synchronization.

2. The system of claim 1, wherein the first control switch and the second control switch are Top-of-Rack (ToR) switch configurations.

3. The system of claim 1, wherein the first control switch operates in the active mode and the second control switch operates in the passive mode, and the second control switch periodically receives an active state advertisement from the first control switch.

4. The system of claim 3, wherein in response to a failure to receive the active state advertisement over a pre-determined time, the second control switch may determine that the first control switch has failed and to promote the second control switch to the active mode by a Keepalived component.

5. The system of claim 4, wherein the Keepalived component is disposed between the first control switch and the second control switch, wherein the Keepalived component associates the floating IP address to the second control switch and unmounts the key-value database on the first control switch.

6. The system of claim 1, wherein the single instance of the key-value database is an etc distributed (etcd) system.

7. The system of claim 1, wherein the distributed block system is a distributed replicated block device (DRBD).

8. The system of claim 1, wherein the distributed block system syncs data between the first control switch and the second control switch through a first virtual local area network (VLAN) and through the floating IP address.

9. The system of claim 1, wherein the first control switch and the second control switch are communicatively coupled to the cluster of worker nodes through a second virtual local area network (VLAN) via the floating IP address.

10. The system of claim 1, wherein the floating IP address includes a virtual internet protocol (IP) address, and the virtual IP address is based on Virtual Router Redundancy Protocol (VRRP).

11. The system of claim 10, wherein the single instance of the key-value database includes mounting a database corresponding to one of the first control switch and the second control switch that is operating in the active mode.

12. The system of claim 1, wherein the first control switch comprises a first storage disk and the first storage disk is synchronized with a second storage device of the second control switch via a networked mirroring mechanism.

13. The system of claim 1, wherein the key-value database is unmounted from the other of the one of the first control switch and the second control switch operating in passive mode.

14. The system of claim 1, wherein, based on a determination that the one of the first control switch and the second control switch operating in the active mode as failed, the floating IP address is associated with the other of the one of the first control switch and the second control switch and the key-value database is unmounted from the one of the first control switch and the second control switch.

15. A pair of control switches forming a control plane for a container orchestration platform, the pair of control switches connected to a cluster of worker nodes, comprising:
a first control switch; and
a second control switch, wherein
the first control switch and the second control switch are configured with a virtual internet protocol (IP) address to associate with one of the first control switch and the second control switch operating in active mode, and the control plane and the cluster of worker nodes communicate therebetween via the virtual IP address, wherein the other of the one of the first control switch and the second control switch operates in passive mode; and a single instance of a key-value database is deployed on the one of the first control switch and the second control switch that is operating in the active mode, and the first control switch and the second control switch are functionally coupled by a distributed block system for data synchronization.

16. The pair of control switches forming the control plane of claim 15, wherein the first control switch and the second control switch are deployed on a same rack unit.

17. The pair of control switches forming the control plane of claim 15, wherein the first control switch is deployed on a first rack unit and the second control switch is deployed on a second rack unit different than the first rack unit.

18. The pair of control switches forming the control plane of claim 15, wherein the control plane is disposed on a rack unit configuration taking up 10 to 20% of space.

19. The pair of control switches forming the control plane of claim 15, wherein the cluster of worker nodes include one or more servers for running one or more of computing, storage, or networking applications.

20. The pair of control switches forming the control plane of claim 15, the first control switch operating in the active mode is configured to manage workloads of the container orchestration platform, wherein the workloads include at least one of a containerized application, a container, a pod, or a virtual machine.

21. A method for implementing a container orchestration platform comprising:

maintaining a control plane, wherein the control plane includes a first control switch and a second control switch, and the control plane is deployed in a rack unit configuration;

maintaining a cluster of worker nodes, the cluster of worker nodes is deployed in the rack unit configuration;

maintaining a virtual internet protocol (IP) address between the first control switch and the second control switch for communication with the cluster of worker nodes, wherein maintaining the virtual IP address comprises associating the virtual IP address with one of the first control switch and the second control switch operating in active mode, and wherein the other of the one of the first control switch and the second control switch operates in passive mode; and maintaining a single instance of a storage system on the one of the first control switch and the second control switch that is operating in the active mode, and synchronizing data between the first control switch and the second control switch via a network mirrored system.

22. The method of claim 21, wherein the single instance of the storage system includes mounting the storage system on a control switch operating in active mode.

* * * * *